(12) United States Patent
Nomura

(10) Patent No.: US 6,624,849 B1
(45) Date of Patent: Sep. 23, 2003

(54) SOLID-STATE IMAGING APPARATUS FOR MOTION DETECTION

(75) Inventor: Hitoshi Nomura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/203,799

(22) Filed: Dec. 1, 1998

(30) Foreign Application Priority Data

Dec. 8, 1997 (JP) ............................................ 9-336955
Aug. 10, 1998 (JP) .......................................... 10/226101

(51) Int. Cl.$^7$ ........................ H04N 5/217; H04N 5/225; H04N 7/18; H04N 3/14

(52) U.S. Cl. ........................ 348/241; 348/169; 348/155; 348/302

(58) Field of Search ................... 348/14, 15, 169–172, 348/208.1, 155, 352, 302–304, 319–321, 699, 241, 308; 382/107, 236; 375/240.16; 257/258

(56) References Cited

U.S. PATENT DOCUMENTS

| | | | | |
|---|---|---|---|---|
| 4,963,961 A | * | 10/1990 | Willoughby et al. | 348/155 |
| 5,519,456 A | * | 5/1996 | Inamori | 348/699 |
| 5,552,823 A | * | 9/1996 | Kageyama | 348/155 |
| 5,563,429 A | | 10/1996 | Isogai | |
| 5,602,585 A | * | 2/1997 | Dickinson et al. | 348/155 |
| 5,604,821 A | * | 2/1997 | Ranganathan et al. | 382/236 |
| 5,614,945 A | * | 3/1997 | Sekine et al. | 348/699 |
| 5,631,704 A | | 5/1997 | Dickinson et al. | |
| 5,933,189 A | * | 8/1999 | Nomura | 348/308 |
| 5,949,486 A | * | 9/1999 | Ishihara et al. | 348/699 |
| 5,962,844 A | * | 10/1999 | Merrill et al. | 348/308 |
| 6,014,354 A | * | 1/2000 | Nomura et al. | 369/44.28 |
| 6,215,113 B1 | * | 4/2001 | Chen et al. | 348/308 |

FOREIGN PATENT DOCUMENTS

| | | | | |
|---|---|---|---|---|
| EP | 0871326 A2 | * | 10/1998 | H04N/5/335 |
| JP | 0825188 A | * | 9/1996 | H04N/5/335 |

OTHER PUBLICATIONS

Simoni, Andrea et al.; "A Single Chip Optical Sensor with Analog Memory for Motion Detection"; Jul. 1995; IEEE Journal of Solid–State Circuits; vol. 30, No. 7; pp. 800–806.*

(List continued on next page.)

Primary Examiner—Wendy R. Garber
Assistant Examiner—John M Villecco
(74) Attorney, Agent, or Firm—Ipsolon LLP (57) ABSTRACT

A solid-state imaging apparatus for motion detection detects motion based on differences between pixel frames to make external image comparison processing unnecessary and to reduce erroneous detection of motion. The solid-state imaging apparatus includes a plurality of photoreceptive units arranged in a matrix of rows and columns, a plurality of vertical read lines disposed on each column of the plurality of photoreceptive units, a vertical transfer circuit that sequentially selects a specified row of the plurality of photoreceptive units and successively outputs to a vertical read line a previous pixel output, saved from a previous exposure of incident light on the photoreceptors, and a current pixel output newly generated from exposure of incident light on the photoreceptors, a comparison circuit that compares the previous pixel output and the current pixel output transferred by time division via the vertical read lines, a horizontal transfer circuit which serially transfers the comparison circuit's signals, and a logical calculation circuit that performs a logical calculation on the comparison circuit's signals and reduces the isolated regions of logical change to provide an object motion signal.

23 Claims, 7 Drawing Sheets

OTHER PUBLICATIONS

Dickinson, Alex et al.; "Standard CMOS Active Pixel Image Sensors for Multimedia Applications"; 1995; IEEE; pp. 214–224.*

Dickinson, Alex et al.; "A 256x256 CMOS Active Pixel Sensor with Motion Detection"; Feb. 16, 1995; 1995 IEEE International Solid–State Circuits Conference—Digest of Technical Papers.*

Nomura, Hitoshi et al.; "A 256x256 BCAST Motion Detector with Simultaneous Video Output"; Feb. 7, 1998; 1998 IEEE International Solid–State Circuits Conference—Digest of Technical Papers.*

Roger A. Panicacci et al., 128Mb/s Multiport CMOS Binary Active Pixel Image Sensor, 1996 IEEE International Solid-State Circuits Conference, 1996, p. 100.

* cited by examiner

SOLID-STATE IMAGING APPARATUS FOR MOTION DETECTION

This application claims priority under 35 USC 119 from Japanese patent application no. 09-336955, filed Dec. 8, 1997 and Japanese patent application no. 10-226101, filed Aug. 10, 1998.

BACKGROUND OF THE INVENTION

1. Field of the Invention

The present invention pertains to a solid-state imaging apparatus for motion detection which detects differences between frames. Specifically, the present invention pertains to a solid-state imaging apparatus for motion detection that reduces external processing circuits and reduces erroneous detection of motion due to small background motions and noise when detecting motion.

2. Description of the Related Art

Prior art processing apparatuses for motion detection sequentially take images of image data from a solid-state imaging apparatus and detect motion based on differences between frames of this image data.

Figure 9:
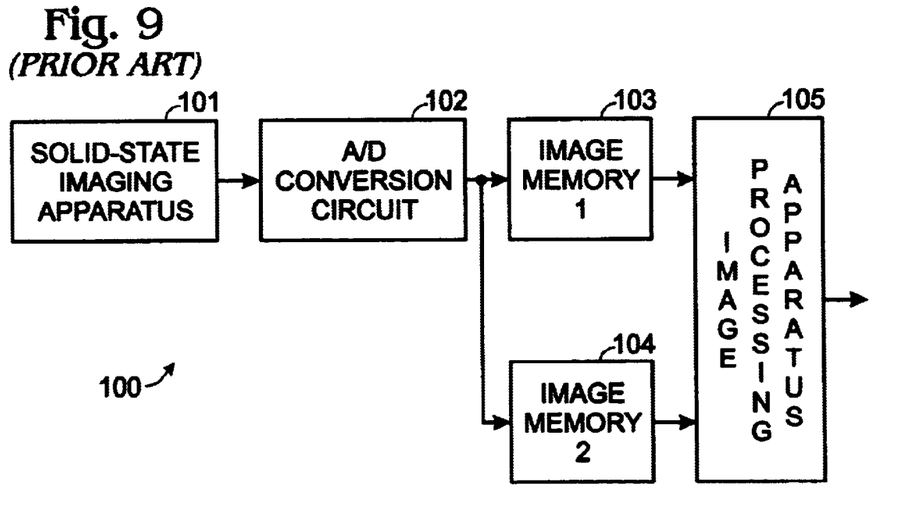
FIG. 9 is a block diagram of a prior art image processing apparatus for motion detection 100.

FIG. 9 is representative of a prior art image processing apparatus for motion detection 100. The image processing apparatus for motion detection 100 consists of a solid-state imaging apparatus 101, A/D conversion circuit 102 that converts the image signal (an analog signal) from the solid-state imaging apparatus 101 into a digital signal, image memory 103 (first image memory) and image memory 104 (second image memory) that save the digital signal from A/D conversion circuit 102, and an image processing circuit 105 that compares the digital image data saved in the image memories 103 and 104 against one another and detects motion.

In this image processing apparatus for motion detection 100, a first frame's image signal (analog signal) obtained by solid-state imaging apparatus 101 is converted into a digital signal by the A/D conversion circuit 102, and then is saved in first image memory 103.

Next a second frame's image signal (analog signal) obtained by solid-state imaging apparatus 101 is converted into a digital signal by the A/D conversion circuit 102, and then is saved in second image memory 104.

The image processing circuit 105 then compares pixels of the digital signal saved in the first image memory 103 with pixels of the digital signal saved in the second image memory 104. The processing circuit detects pixels that differ by more than a specified threshold value and generates a signal indicating detection of a moving object (hereafter the "moving object signal").

In this manner, inter-frame comparison makes it possible to detect motion of a subject.

Nevertheless, the aforesaid conventional image processing apparatus for motion detection 100 has defects in that the motion detection circuitry for the solid-state imaging apparatus 101 is complicated making the image processing apparatus for motion detection 100 overly large and costly.

Another defect is that the image signal output from solid-state imaging apparatus 101 is an analog signal, which is supplied to A/D conversion circuit 102 as an analog signal. Therefore, the analog signal is conducted along a path presenting an opportunity to be easily affected by noise (interference).

Furthermore, in the aforesaid conventional image processing apparatus for motion detection 100 the dynamic range of the analog image signal is limited by A/D conversion circuit 102. The input dynamic range of A/D conversion circuit 102 is usually narrower than the dynamic range of the solid-state imaging apparatus 101. Therefore, there is a defect in that the wide dynamic range of solid-state imaging apparatus 101 cannot be effectively used in the course of detecting and processing a moving object.

Also, the sampling timing in the A/D conversion circuit 102 may become slightly out-of-phase between the successive frames. This type of phase shifting in inter-frame sampling timing creates a slight phase shift in the pixel position to be compared at the image processing circuit 105. If this type of phase shift occurs, a stationary body may have inter-frame differences at its edge portions. Therefore, there is a defect in prior art solid-state imaging apparatuses that the precision and reliability of moving object detection are lowered.

One proposal for avoiding the aforesaid defects is to provide a memory to store the image signal for the immediately previous frame and the current frame in each pixel of solid-state imaging apparatus 101, and to additionally provide each pixel with a comparison circuit to compare the image signal stored in this memory, and to generate a moving object signal for each pixel.

However, this sort of countermeasure has the defects of making the structure of the unit pixel complicated, and reducing the numerical aperture and resolution of solid-state imaging apparatus 101. In addition, the aforesaid countermeasure can output only the moving object signal from each pixel. Thus, this design has the defect that the solid-state imaging apparatus would not be able to simultaneously provide an image signal, which is an undesirable result.

Incidentally, it is generally known that a solid-state imaging apparatus consisting of a semiconductor device experiences charge fluctuations, which create shot noise.

The magnitude of shot noise is proportional to the square root of the signal magnitude. Therefore, the brighter the subject and the higher the signal level, the greater the shot noise that is created. As a result, in bright locations shot noise looms large in inter-frame differences. If shot noise occurs in inter-frame differences and exceeds the threshold value for a moving-object decision, erroneous motion detection may occur.

One proposal for avoiding erroneous detection due to shot noise is to set the comparison threshold value for differences between frames uniformly high. Nevertheless, this sort of countermeasure has the problem that sufficient motion detection cannot be performed for a low-contrast subject.

Also, in addition to the case described above, differences between frames also occur in situations, such as when tree leaves wave in a wind. This sort of motion is small motion in the background, and should be distinguished from motion of the detection subject which is being monitored.

SUMMARY OF THE INVENTION

The present invention provides a solid-state imaging apparatus for motion detection which reduces external image comparison processing circuits and does not detect shot noise or small background motions when detecting motion. In addition, the present invention provides a solid-state imaging apparatus for motion detection which can simultaneously output a moving object signal and an image signal. Also, the present invention provides a solid-state imaging apparatus for motion detection which can selectively reduce erroneous detection of motion due to shot noise.

Furthermore, the present invention provides a solid-state imaging apparatus for motion detection which can reduce erroneous detection of motion in the screen's horizontal direction and in the screen's vertical direction. In addition, the present invention provides a solid-state imaging apparatus for motion detection which can reduce erroneous detection of motion in the time axis direction.

In a preferred embodiment of the present invention a solid-state imaging apparatus for motion detection includes a plurality of photoreceptive units arranged in a matrix and creating pixel output corresponding to incident light and a plurality of vertical read lines disposed on each column of the plurality of photoreceptive units. A vertical transfer circuit sequentially selects a specified row of the plurality of photoreceptive units and successively outputs to the vertical read line the previous frame's pixel output saved in the past from the specified row of photoreceptive units, then the current frame's pixel output newly saved from the specified row of photoreceptive units. A comparison circuit, disposed on each of the vertical read lines, compares the previous frame's pixel output and the current frame's pixel output transferred by time division via the vertical read lines. A horizontal transfer circuit horizontally transfers the aforesaid comparison circuit's comparison results output on each of the vertical read lines. And, a logical calculation circuit performs a logical calculation on the comparison circuit's comparison results and reduces the isolated regions of logical change.

The solid-state imaging apparatus for motion detection uses a vertical transfer circuit to output the "previous frame's electrical signal" and the "current frame's electrical signal" on the vertical read line by time division in row units. The comparison circuit takes the "previous frame's electrical signal" and the "current frame's electrical signal" output in this sort of time division manner and compares them. The horizontal transfer circuit horizontally transfers this comparison result.

The logical calculation circuit performs a logical calculation to reduce the isolated regions of logical change for this comparison result. In general, differences between frames arising from shot noise or tiny background motions occur randomly and briefly. Therefore, most of the noise component appears as isolated regions of logical change (in many cases, an isolated point) in the inter-frame comparison result.

In contrast, the detection subject occupies a greater area of the screen, and has a definite movement. The detection subject movement appears as band-like regions along the edge portion in the inter-frame comparison result. Therefore, by performing a logical calculation to reduce the isolated regions of logical change, the logical calculation circuit can efficiently reduce erroneous detection of motion caused by shot noise or tiny background motions.

The term "frame" in this application means one frame's worth of image. Accordingly, the solid-state imaging apparatus for motion detection need not be limited to devices which perform progressive scanning. For example, the present invention may be applied to devices that perform interlaced scanning. In interlaced scanning, detection of motion is based on the difference between the current field and the previous field.

The present invention also provides an image signal output circuit that selectively takes and horizontally transfers either the previous frame's pixel output or the current frame's pixel output transferred by time division via a vertical read line. This circuit selectively outputs one of the pixel outputs transferred by time division on a vertical read line, so the output circuit can output the current frame's, or the previous frame's, image signal.

In the present invention, the image signal output operation does not monopolize the vertical read line, so it does not interfere with the operation of the motion detection side. Therefore, it is possible to output a moving object signal and an image signal simultaneously.

The present invention also provides a level decision circuit that decides the level of an image signal output from the image signal output circuit, and an output switching circuit that switches and outputs the output of the logical calculation circuit and the comparison circuit's comparison results according to the level decision circuit's decision result.

Because shot noise occurs in proportion to the square root of the signal level, it is concentrated in the high luminance areas of the image signal. Therefore, by deciding whether the image signal exceeds a prescribed level, the level decision circuit can determine the regions most likely to include significant shot noise.

Therefore, for example, when the image signal exceeds a prescribed level the output switching circuit should selectively output the logical calculation circuit output, and when the image signal falls below a prescribed level the output switching circuit should output the comparison circuit's comparison result. This sort of switching operation can selectively and reliably reduce erroneous detection of motion caused by shot noise. Additionally, there is no unnecessary removal of isolated regions with little shot noise, so the detection apparatus can reliably detect the motion of small detection subjects.

On the other hand, in cases in which the signal level is extremely small, random noise from circuit systems and the like dominate. (In particular, random noise is amplified and strongly manifested in connection with signal level drops when a peak AGC circuit or the like is interposed in a circuit.) Performing output switching between "logical calculation circuit output" and "comparison circuit's comparison result" in response to the level decision circuit's decision result as in the examples given above makes it possible to selectively reduce motion detection errors due to noise, etc., and makes it possible to detect the motion of small detection subjects.

The present invention also provides a solid-state imaging apparatus for motion detection having a bit memory circuit that stores the comparison result for each 1 pixel horizontally transferred, and a horizontal AND circuit that performs a logical AND calculation on the bit memory circuit's stored contents and the comparison result.

The present invention also provides a solid-state imaging apparatus for motion detection having a line memory circuit that stores the comparison result for each 1 line, and a vertical AND circuit that performs a logical AND calculation on the line memory circuit's stored contents and the comparison result.

The present invention also provides a solid-state imaging apparatus for motion detection having a frame memory circuit that stores the comparison result for each 1 screen, and a time axis AND circuit that performs a logical AND calculation on the frame memory circuit's stored contents and the comparison result.

In preferred embodiments, the present invention also provides a solid-state imaging apparatus having a pixel output save unit, provided for each of the photoreceptive units, which saves the pixel output from the photoreceptive unit, and nondestructively outputs the saved pixel output, a connection and separation unit, provided for each of the pixel output save units, which connects and separates the pixel output save unit's output stage and the vertical read line, and vertical transfer control means which, after the previous frame's pixel output saved in the past at the specified row's pixel output save unit is output to the vertical read line via the connection and separation unit, newly saves the current frame's pixel output from the photoreceptive units in the pixel output save unit, and outputs the saved current frame's pixel output to the vertical read line via the connection and separation unit.

The present invention also provides a solid-state imaging apparatus having an amplifier element which has a control region that saves pixel output and that outputs a signal corresponding to the pixel output saved in the control region, a transfer circuit that transfers the pixel output created by the photoreceptive unit to the amplifier element's control region, and a reset circuit which resets the pixel output accumulated in the amplifier element's control region.

The present invention also provides a solid-state imaging apparatus for motion detection wherein the amplifier element is a junction type field-effect transistor, and the pixel output transferred via the transfer circuit is directly accumulated in the gate region of the junction type field-effect transistor.

The present invention also provides a solid-state imaging apparatus for motion detection wherein the comparison circuit is a circuit that decides whether or not the current frame's pixel output and the previous frame's pixel output agree within an allowed range, and that outputs a binary signal according to the truth or falsity of the decision result.

DESCRIPTION OF THE PREFERRED EMBODIMENTS

Next, preferred embodiments of the present invention are explained with reference to the accompanying figures.

Figure 1:
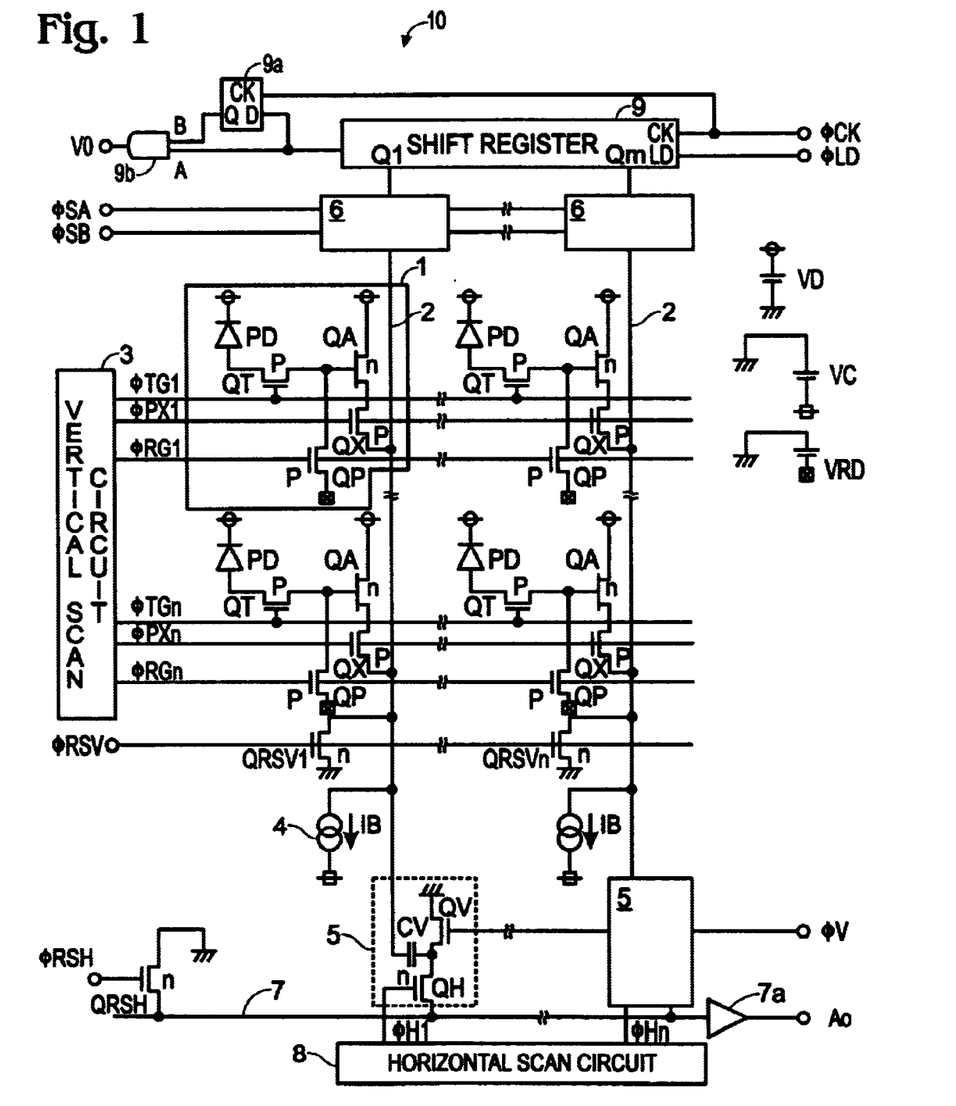
FIG. 1 is a schematic drawing of a circuit of a first preferred embodiment of a solid-state imaging apparatus for motion detection of the present invention.

A first embodiment of the present invention is described with reference to FIGS. 1–4. FIG. 1 is a schematic drawing of a circuit of the first embodiment. Unit pixels 1 in solid-state imaging apparatus for motion detection 10 are arranged in a matrix with n rows and m columns. The output of these unit pixels 1 is commonly connected to each vertical column, forming m vertical read lines 2.

Also, vertical scan circuit (or vertical transfer circuit) 3 for determining vertical transfer timing is provided in solid-state imaging apparatus for motion detection 10. This vertical scan circuit 3 respectively supplies three types of control pulses, $\phi TG1$, $\phi PX1$, and $\phi RG1$ to the first row's unit pixel 1. Similarly, three types of control pulses, $\phi TG2 \ldots \phi TGn$, $\phi PX2 \ldots \phi PXn$, and $\phi RG2 \ldots \phi RGn$, are respectively supplied from vertical scan circuit 3 to the unit pixels 1 in the remaining rows 2 to n.

Current source 4 for supplying bias current, differential processing circuit 5 (a correlated double-sampling circuit), and comparison, or abnormal value detection, circuit 6 are connected to the aforesaid m vertical read lines 2 respectively.

Control pulse $\phi V$ is supplied in common to the sampling control terminals of these differential processing circuits 5. Furthermore, control pulse $\phi V$ is provided by vertical scan circuit 3, or other source. Also, the output terminals of differential processing circuits 5 are all connected in common, forming horizontal read line 7 for the image signal. The image signal output on this horizontal read line 7 is output from the solid-state imaging apparatus 10 via video amp circuit 7a.

Together, the differential processing circuits 5, horizontal read line 7 and horizontal scan circuit 8 comprise an image signal output circuit.

Reset MOS switch QRSH is also connected to horizontal read line 7. Reset control pulse $\phi RSH$ is supplied to the gate of this MOS switch QRSH. This control pulse $\phi RSH$ is output from horizontal scan circuit 8, or other source.

Horizontal scan circuit 8 for determining horizontal transfer timing is provided in solid-state imaging apparatus for motion detection 10. Control pulse $\phi H1$ is supplied from this horizontal scan circuit 8 to the scan control terminal for the first column's differential processing circuit 5. Similarly, control pulses $\phi H2 \ldots \phi Hm$, which are output from horizontal scan circuit 8, are respectively supplied to the scan control terminals of the remaining 2 to m columns of differential processing circuits 5.

Meanwhile, two types of control pulses, $\phi SA$ and $\phi SB$, are supplied in common to the sampling control terminals of m abnormal value detection circuits 6. Control pulses $\phi SA$ and $\phi SB$ may be output from vertical scan circuit 3, or other source. Also, output terminals Q1 ... Qm of m abnormal value detection circuits 6 are respectively connected to shift register (horizontal transfer circuit) 9's parallel inputs. Control pulse $\phi LD$ for determining parallel data intake timing and transfer clock $\phi CK$ for serial transfer are input to shift register 9. These pulses $\phi LD$ and $\phi CK$ can be supplied from horizontal scan circuit 8, or other circuit. Also, shift register 9's serial output is supplied to D flip flop (a bit memory circuit) 9a's data input and to one input of AND circuit 9b respectively.

The transfer clock $\phi CK$ supplied to shift register 9 is similarly provided to the clock input of this D flip flop 9a. Also, D flip flop 9a's output Q is supplied to the other input of AND circuit 9b. The D flip flop 9a and AND circuit 9b form a logical calculation circuit. The output of this AND circuit 9b is output to outside solid-state imaging apparatus for motion detection 10 as the moving object signal.

Next, based on FIG. 1, the specific circuit structure and connection relationship shall be explained for a unit pixel 1 located at the first row and first column. The other unit pixels 1 have the same circuit structure as the first row/first column unit pixel 1, the only difference being the label on the control pulses.

Photodiode PD is provided in unit pixel 1. The anode of photodiode PD is connected via charge transfer MOS switch QT to the gate of amplifier element QA, which preferably consists of a junction-type field-effect transistor. Control pulse φTG1, which is output from vertical scan circuit 3, is supplied to the gate of the charge transfer MOS switch QT.

The gate of amplifier element QA is connected via signal charge reset MOS switch QP to a wiring layer held at a constant reset potential VRD. Control pulse φRG1, which is output from vertical scan circuit 3, is supplied to the gate of this MOS switch QP.

Meanwhile, the source of amplifier element QA is connected via vertical transfer MOS switch QX to vertical read line 2. Control pulse φPX1, which is output from vertical scan circuit 3, is supplied to the gate of this MOS switch QX.

The amplifier element QA, MOS switch QT, and MOS switch QP correspond to a pixel output save unit. The vertical transfer MOS switch QX corresponds to a connection and separation unit. Vertical scan circuit 3's function of reading two frames of pixel output in units of one row by time division corresponds to a vertical transfer control means.

With reference to FIG. 1, the circuit structure is explained for differential processing circuit 5, provided at the first column's vertical read line 2. The differential processing circuits 5 for the second column and thereafter have the same circuit structure as the first column's differential processing circuit 5, the only difference being some of the labels on the control pulses.

First, one end of capacitor CV is connected to vertical read line 2 to hold the dark signal. The other end of capacitor CV is connected to MOS switch QV, which provides a constant potential such as the ground potential, and to horizontal transfer MOS switch QH. The opposite side of MOS switch QH is connected to horizontal read line 7. The control pulse φV is supplied to the gate of MOS switch QV. Also, control pulse φH1, which is output from horizontal scan circuit 8, is connected to the gate of MOS switch QH.

Figure 2:
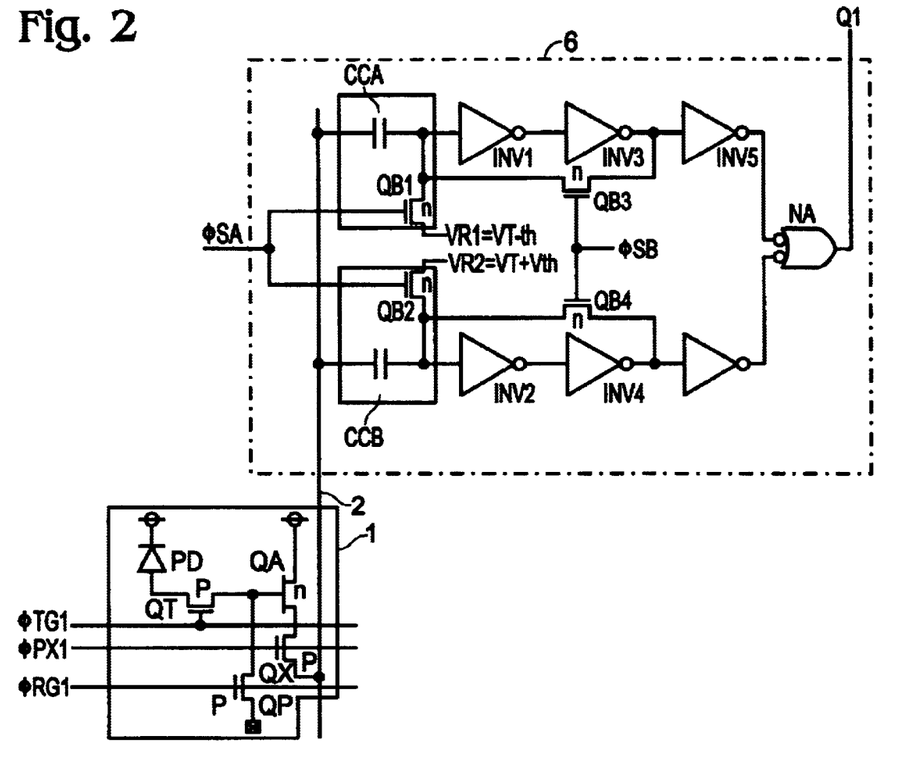
FIG. 2 is a schematic drawing of a circuit of an abnormal value detection circuit of the present invention.

With reference to FIG. 2, the circuit structure is explained for abnormal value detection circuit 6, provided at vertical read line 2's first column. The abnormal value detection circuits 6 for the second column and thereafter have the same circuit structure as the first column's abnormal value detection circuit 6, the only difference being the label on the output signal.

A first end of two capacitors CCA and CCB is respectively connected to vertical read line 2.

A second end of capacitor CCA is connected via three inverters INV1, INV3, and INV5 in series to one input terminal of NAND circuit NA. The second end of capacitor CCA is also supplied via MOS switch QB1 with voltage VR1 (=VT−Vth) (defined below) in order to determine the threshold value. Control pulse φSA is supplied to the gate of this MOS switch QB1. In addition, the second end of capacitor CCA is connected via MOS switch QB3, which makes an intermittent positive feedback loop, to the output of inverter INV3. Control pulse φSB is supplied to the gate of this MOS switch QB3.

Meanwhile, a second end of capacitor CCB is connected via two inverters INV2 and INV4 in series to the other input terminal of NAND circuit NA. Also, the second end of capacitor CCB is supplied via MOS switch QB2 with voltage VR2 (=VT+Vth) in order to determine the threshold value.

Voltage VT is a value equivalent to the threshold voltage of inverters INV1 and INV2. Voltage Vth is a threshold value for determining whether or not the difference between frames is significant.

Control pulse φSA is also supplied to the gate of the MOS switch QB2. In addition, the second end of capacitor CCB is connected via MOS switch QB4, which makes an intermittent positive feedback loop, to the output of inverter INV4. Control pulse φSB is supplied to the gate of the MOS switch QB4.

The output of the aforesaid NAND circuit NA is supplied to shift register 9's parallel input terminal Q1.

Figure 3:
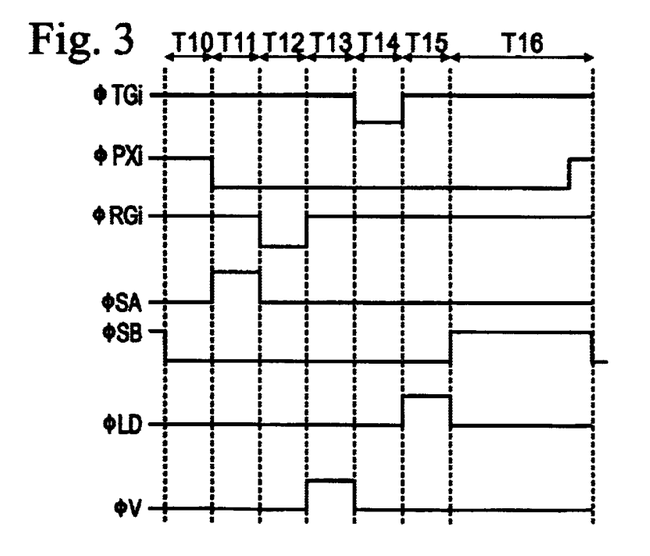
FIG. 3 is a drawing showing the drive timing for vertical transfer in the first preferred embodiment.

FIG. 3 is a drawing showing the drive timing for vertical transfer of row i in the first embodiment.

In time interval t10, φTGi is held at a high level thereby maintaining p-type switch QT in a non-conducting state. Similarly, φPXi is held high keeping p-type switch QX non-conducting. φRGi is also at a high level so that p-type switch QP is non-conducting and the gate region of amplifier QA is floating at a level associated with a charge potential generated by photodiodes PD during a previous cycle.

In time interval t10, control pulse φSB goes to a low level. As a result, n-type MOS switches QB3 and QB4 in abnormal value detection circuit 6 are interrupted (non-conducting), and the other ends of capacitors CCA and CCB are set in a floating state.

In time interval t11, control pulse φPXi is held at a low level, and control pulse φSA goes to a high level. Taking control pulse φPXi down makes row i's n-type MOS switches QX conduct. When this happens, the signal charge which was saved in the gate region of amplifier element QA when the previous frame was read is conducted through switch QX. Therefore, the source follower circuit consisting of amplifier element QA outputs the previous frame (row i's pixel output Vold) on vertical read line 2.

Meanwhile, at the abnormal value detection circuit 6 side, control pulse φSA going high makes MOS switches QB1 and QB2 conduct. As a result, a charging path is temporarily formed via capacitors CCA and CCB. As a result, the voltage (Vold−VT+Vth) is charged across capacitor CCA and the voltage (Vold−VT−Vth) is charged across capacitor CCB.

When period t11 ends, control pulse φSA falls to a low level. Therefore, the second ends of capacitors CCA and CCB are again floating. As a result, the aforesaid voltage is saved as the voltage across capacitors CCA and CCB.

Next, in timing period t12, control pulse φRGi goes to a low level. When this happens, MOS switch QP becomes conducting, and the previous frame's signal charge saved in amplifier element QA's gate region is discharged. As a result, the gate region is initialized to reset voltage VRD via the wiring layer.

When period t12 ends, control pulse φRGi returns to a high level. As a result, MOS switch QP is interrupted, and amplifier element QA's gate region stays floating and saves the reset voltage.

Next, in timing period t13, control pulse φPXi is held at the original low level. Thus dark signal Vd is output on vertical read line 2 via amplifier element QA's source follower circuit. This dark signal Vd is a signal which includes reset noise from the reset operation (so-called kTC noise) or voltage fluctuations between amplifier element QA's gate and source, which are the main cause of fixed pattern noise.

Meanwhile, control pulse φV goes to a high level in period t13. At the differential processing circuit 5 side, control pulse φV going high makes MOS switch QV conduct. As a result, a charging path is formed on capacitor CV, and row i's dark signal Vd charges capacitor CV in differential processing circuit 5. When period t13 ends, control pulse φV falls. Consequently, one end of capacitor CV becomes floating again, and row i's dark signal Vd is saved as the voltage across the capacitor CV group.

Next, control pulse φTGi falls to a low level in timing period t14. When this happens, MOS switch QT becomes conducting in row i's unit pixel 1, and the current frame's signal charge saved in row i's photodiode PD is transferred to amplifier element QA's gate region.

When period t14 ends, control pulse φTGi returns to a high level. As a result, MOS switch QT is interrupted, and amplifier element QA's gate region stays floating and saves the increased potential corresponding to the transferred signal charge from photodiodes PD.

Next, in timing period t15, control pulse φPXi is still at the low level. Thus, the current frame (row i's pixel output Vnow) are newly output from vertical read line 2 via amplifier element QA's source follower circuit.

During this period t15, one end of capacitor CV at the differential processing circuit 5 side experiences a differential voltage with row i's dark signal Vd subtracted from the current row i's pixel output Vnow. This differential voltage is the "current frame's pixel output" with the dark signal component removed.

And meanwhile, during this period t15, voltage (Vnow−Vold+VT−Vth) appears across capacitor CCA at the abnormal value detection circuit 6 side and the voltage (Vnow−Vold+VT+Vth) appears across capacitor CCB. These voltages are reflected in the boundaries of threshold voltage VT via inverters INV1 and INV2.

As a result of the voltage relationships described above, inverter INV1 outputs a low level when the inter-frame pixel output difference (Vnow-Vold) exceeds Vth. Conversely, inverter INV1 outputs a high level when the inter-frame pixel output difference (Vnow-Vold) falls below Vth.

Also, inverter INV2 outputs a low level when the inter-frame pixel output difference (Vnow-Vold) exceeds (−Vth). And, inverter INV2 outputs a high level when the inter-frame pixel output difference (Vnow-Vold) falls below (−Vth).

These logical outputs pass through inverters INV3 to INV5, and then are respectively input to NAND circuit NA. As a result, NAND circuit NA outputs at a low level when the value of the inter-frame pixel output difference (Vnow-Vold) is within the allowed range of (−Vth) to Vth. And it outputs at a high level when the value of the inter-frame pixel output difference (Vnow-Vold) is outside the allowed range of (−Vth) to Vth. Through this operation the output of NAND circuit NA is a binary signal indicating whether or not the inter-frame pixel output agrees with the allowed range.

Control pulse φLD goes to a high level in period t15. As a result, the binary signals output from m NAND circuits NA are accepted in one batch by shift register 9's parallel input terminals Q1 . . . Qm, and respectively saved as shift register 9's internal values D1 . . . Dm.

Next, in timing period t16, control pulse φSB goes high, making MOS switches QB3 and QB4 conduct. As a result, capacitors CCA and CCB are recharged in the positive feedback direction via inverters INV3 and INV4, and the output of NAND circuit NA is stabilized.

Figure 4:
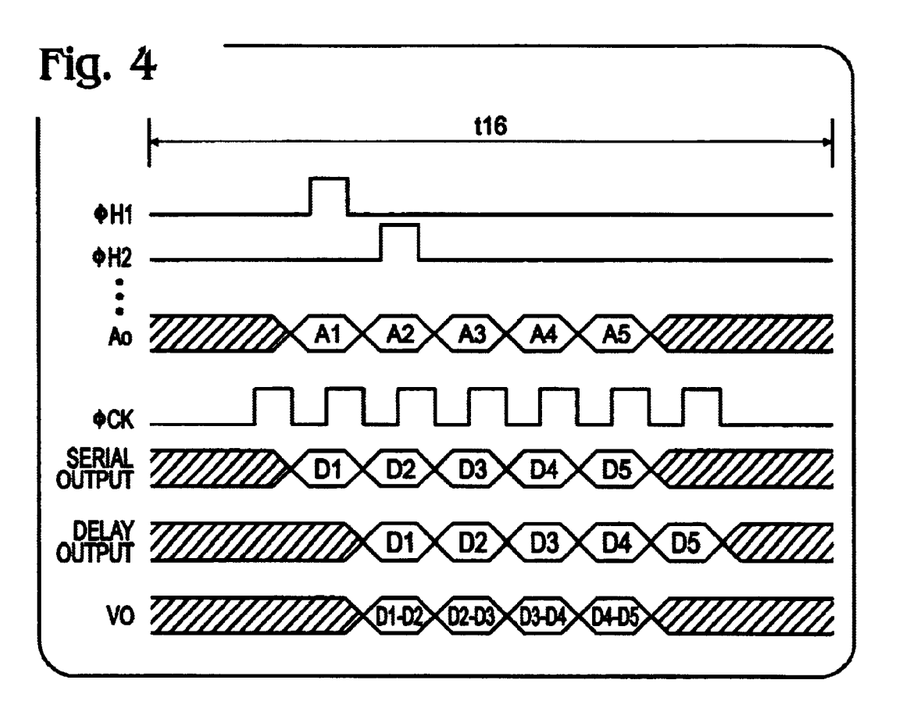
FIG. 4 is a drawing showing the drive timing for horizontal transfer in the first preferred embodiment.

FIG. 4 is a drawing showing the drive timing for horizontal transfer in period t16. First, in timing period t16, horizontal scan circuit 8 sequentially sets control pulses pH1 . . . φHm to a high level, one after another.

Therefore one end of m columns of capacitors CV is connected to horizontal read line 7 in the sequence of columns 1 to m. As a result, the current frame and row i's image signal (A1 . . . A5, etc. in FIG. 4) are sequentially output on horizontal read line 7.

Furthermore, in coordination with the period in which control pulses φH1 . . . φHm are at a high level, φRSH is temporarily set to a high level. Through this sort of operation the residual charge on horizontal read line 7 is discharged each time via MOS switch QRSH. Therefore, a residual charge does not get mixed into the horizontally transferred image signal.

And meanwhile, in timing period t16, transfer pulse φCK is sequentially applied to shift register 9. Internal values D1 . . . Dm are serially output from the serial output of shift register 9 in sync with the fall of this transfer pulse φCK.

The serial output D1 . . . Dm passes through D flip flop 9a and is delayed by just one pixel (one clock pulse). AND circuit 9b performs a logical AND operation on serial output D1 . . . Dm and delayed serial output D1 . . . Dm, and outputs it externally as the moving object signal V0.

Furthermore, the series of processes performed on row i as described above are repeatedly performed in sequence on other horizontal rows, so the current frame's image signal is sequentially output from horizontal read line 7, and one frame of moving object signal is sequentially output from output terminal V0.

In the first embodiment, through the operation described above, abnormal value detection circuit 6 compares two frames of pixel output which are output on vertical read line 2 by time division, thereby making it possible to detect motion of the detection subject.

Therefore, it becomes completely unnecessary to provide support circuits such as an A/D conversion circuit, image memory or image processing circuits, etc. external to the solid-state imaging apparatus in order to perform motion detection. As a result, the monitoring apparatus needed to detect motion can be made into an apparatus which is small and inexpensive.

Also, in the first embodiment the moving object signal is created without using an A/D conversion circuit. Therefore there are no dynamic range limitations due to the A/D conversion circuit, and motion can be detected using the wide dynamic range of the solid-state imaging apparatus itself.

Also, in the first embodiment the previous frame's pixel output and the current frame's pixel output are compared without pixel position phase shifting inside the solid-state imaging apparatus. Therefore there is no problem of erroneous detection of motion in the image's edge portion, as compared to examination by an external circuit of the differences between frames.

Also, in the first embodiment the "current frame's pixel output" is selectively output on vertical read line 2 by time division, so the image signal can be output. Simultaneous output of the moving object signal and the image signal in this manner makes it extremely suitable for applications in which motion is detected while observing (recording) a screen, as in a monitoring apparatus.

In addition, vertical read line 2 is efficiently utilized in the first embodiment to output two frames of pixel output and also the dark signal by time division. Based on this dark signal, differential processing circuit 5 can obtain high-quality pixel output with the dark signal removed.

In particular, the first embodiment uses a logical calculation circuit consisting of D flip flop 9a and AND circuit 9b to examine serial outputs D1 . . . Dm and remove isolated points at which only one pixel is at high level in the screen horizontal direction. Therefore, it is possible to efficiently reduce erroneous detection of motion caused by shot noise or small background motions.

Furthermore, in the first embodiment a single D flip flop 9a was provided and the logical AND calculation for the moving object signal was performed between two horizontally adjacent pixels, but the present invention is not restricted to this. For example, two or more bit memories (flip flop circuits, etc.) can be arranged in series and a logical AND calculation can be performed on the output of each of these bit memories and the serial output of shift register 9. This sort of structure allows performing logical AND calculations over a wide range, so motion detection errors can be reduced even more reliably.

Figure 5:
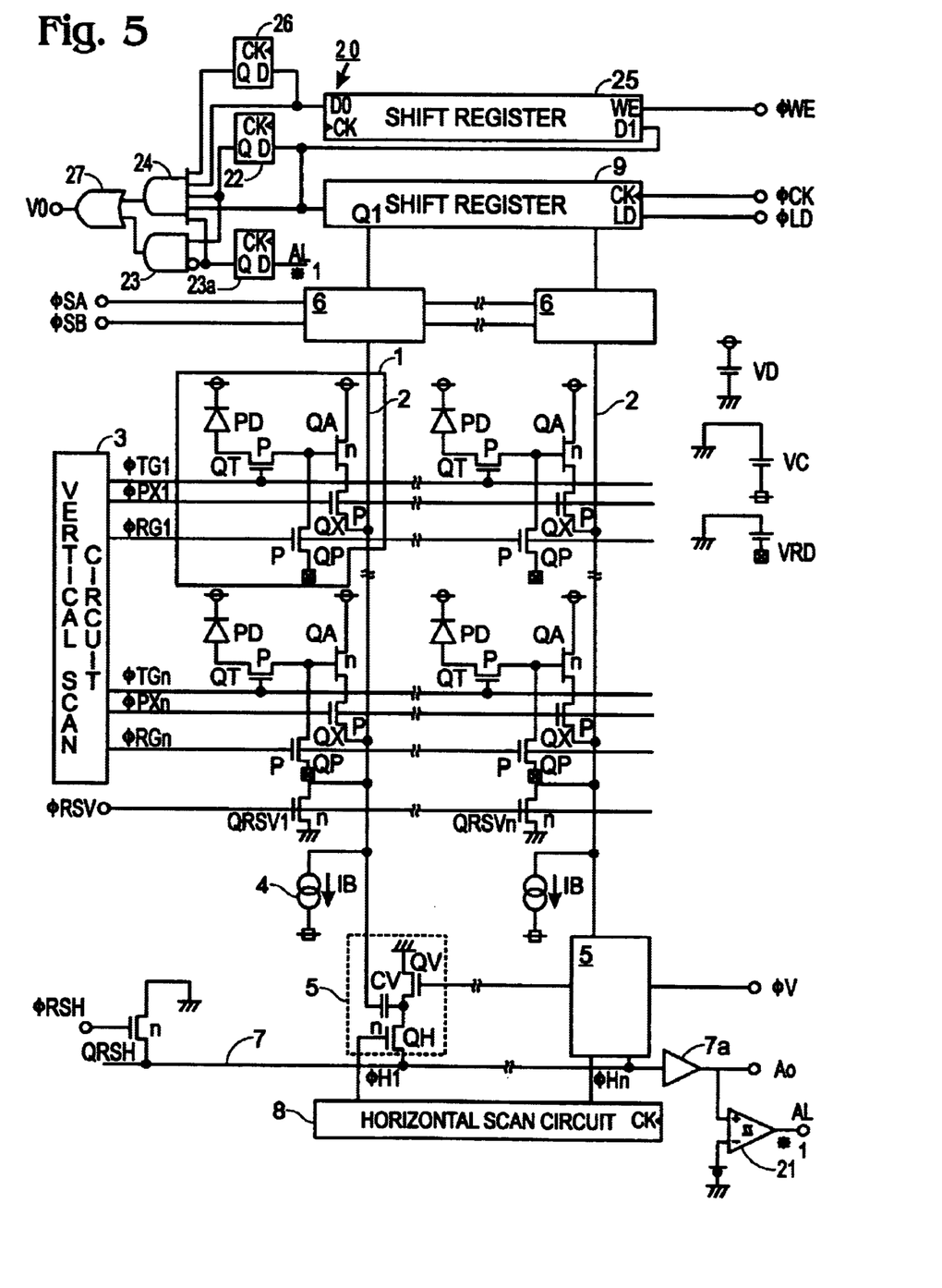
FIG. 5 is a schematic drawing of a circuit of a second preferred embodiment of the present invention.

A second preferred embodiment is now explained with reference to FIGS. 5 and 6. FIG. 5 is a schematic drawing of the circuit of the second embodiment.

The following discussion relates to differences of the second preferred embodiment 20 as to the first preferred embodiment 10. First, video amp 7a is provided on horizontal read line 7. The image signal output from this video amp 7a is externally output and also supplied to comparator 21's positive side input. Comparator 21 decides the threshold value of the image signal level and outputs binary level decision signal AL.

This level decision signal AL passes through D flip flop 23a and is delayed by just one horizontal pixel, and then supplied to AND circuit 23's inverted side input and to AND circuit 24's first input respectively.

Meanwhile, shift register 9's serial output is respectively supplied to "D flip flop 22's data input", "AND circuit 24's second input", and "shift register 25's serial input". D flip flop 22's data output is respectively supplied to "AND circuit 23's non-inverted side input" and "AND circuit 24's third input".

Also, shift register 25's serial output is respectively supplied to AND circuit 24's fourth input and D flip flop 26's data input. D flip flop 26's data output is supplied to AND circuit 24's fifth input.

In addition, the aforesaid AND circuit 23's output and AND circuit 24's output are respectively input to OR circuit 27. OR circuit 27's output is externally output as the moving object signal.

Other schematic requisites are identical to the schematic requisites of the first preferred embodiment of FIG. 1, and are indicated by the same reference codes in FIG. 5, and discussion of them is omitted here.

Next, the operation when doing a horizontal transfer in the second embodiment is explained. The vertical transfer operation in the second embodiment is the same as in the first embodiment of FIG. 3, so discussion of that operation is omitted here.

Figure 6:
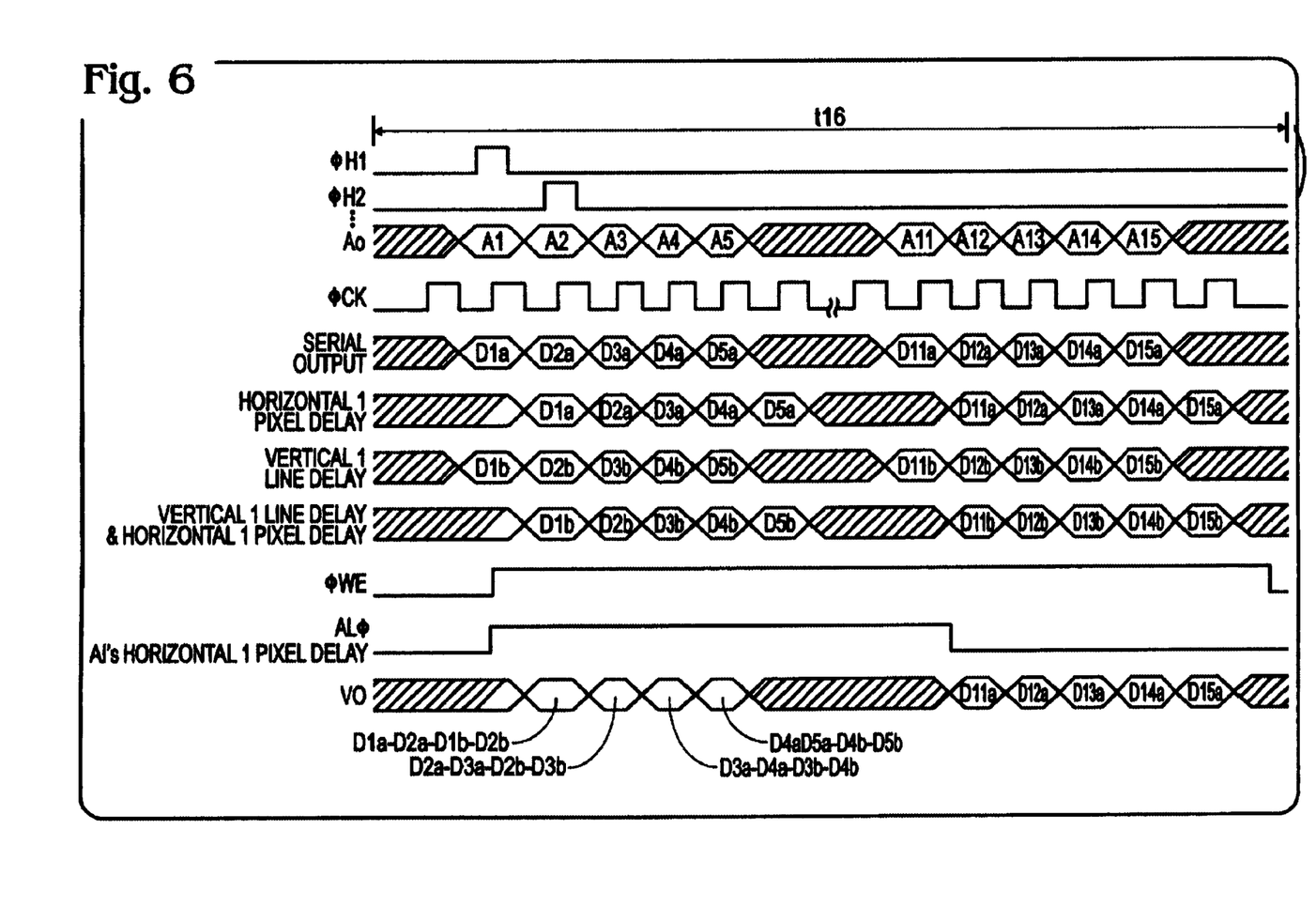
FIG. 6 is a drawing showing the drive timing for horizontal transfer in the second preferred embodiment.

FIG. 6 is a drawing showing the drive timing for horizontal transfer in period t16. First, in timing period t16, horizontal scan circuit 8 sequentially sets control pulses φH1 . . . φHm to high level, one after another. Therefore one end of m columns of capacitors CV is connected to horizontal read line 7 in the sequence of columns 1 to m. As a result, the current frame and row i's image signal (A1 . . . A5, A11 . . . A15, etc. in FIG. 6) are sequentially output on horizontal read line 7.

Comparator 21 decides the threshold value of the image signal level and outputs level decision signal AL. This level decision signal AL is a binary signal indicating a high level at the image signal's high luminance area.

Meanwhile, in timing period t16, transfer pulse φCK is sequentially applied to shift register 9 and shift register 25. Inter-frame comparison results D1a . . . Dma, which are the output of abnormal value detection circuit 6, are serially output from the serial output of shift register 9 in sync with the fall of this transfer pulse φCK.

Inter-frame comparison results D1a . . . Dma pass through shift register 25 and are delayed just by one vertical line. As a result, comparison results D1b . . . Dmb, which are delayed just by one vertical line, are sequentially output from shift register 25's serial output.

The aforesaid comparison results D1a . . . Dma pass through D flip flop 22 and are delayed by just one pixel (one clock pulse). Also, comparison results D1b . . . Dmb, which are delayed just by one vertical line, pass through D flip flop 26 and are additionally delayed by just one pixel (one clock pulse). As a result, the inter-frame comparison results are summarized as just 2 vertical pixels×2 horizontal pixels and simultaneously input to the four input terminals of AND circuit 24.

Meanwhile, D1a . . . Dma, which is one pixel of inter-frame comparison result, is input to the input terminal on AND circuit 23's noninverted side in a state which is delayed by just one horizontal pixel.

Level decision signal AL is input in mutually inverted phases to the remaining input terminals of these AND circuits 23 and 24. Therefore output switching is performed according to the logical value of level decision circuit AL:

(1) First, at high luminance areas of the image signal (if level decision signal AL, delayed by one horizontal pixel, is at a high level) a logical AND operation is performed on the inter-frame comparison result with each of the 2 vertical pixels×2 horizontal pixels, and the result is output from OR circuit 27. As a result, isolated regions of the sort in which even one pixel is at a low level in either the horizontal or vertical or diagonal direction are removed from the inter-frame comparison results;

(2) At non-high luminance areas of the image signal (if level decision signal AL, delayed by one horizontal pixel, is at a low level) the inter-frame comparison result passes through D flip flop 22 and AND circuit 23 and is output from OR circuit 27 in a state which is delayed by just one horizontal pixel.

This sort of delay operation is a supplementary operation to match the pixel position and phase in the output of the AND circuit 24 side. This delay operation makes seams in the moving object signal due to output switching less conspicuous.

The operation of the second embodiment excludes from the inter-frame comparison results isolated regions which occur when only one pixel is at a high level in either the horizontal or vertical or diagonal direction. As a result, it is possible to efficiently reduce isolated regions caused by shot noise.

Also, in the second embodiment the aforesaid isolated region removal is performed only in the high luminance areas of the image signal. This sort of image signal high luminance areas are sites where the creation of shot noise is particularly concentrated. Therefore removing isolated regions restricted to this sort of high luminance area makes it possible to efficiently reduce the isolated regions created by shot noise.

Meanwhile, at non-high luminance areas of the image signal, inter-frame comparison results pass through AND circuit 23 and are output in a state which is delayed by just one horizontal pixel. Therefore there is no risk of removing isolated regions which are essentially unrelated to shot noise. As a result, it becomes possible to detect the motion of small detection subjects with greater reliability.

Furthermore, in the second embodiment a single shift register 25 (a type of line memory circuit) was provided and the logical AND calculation for the moving object signal was performed between two vertically adjacent pixels, but the present invention is not restricted to this. For example, two or more line memory circuits (shift registers, etc.) can be vertically arranged and a logical AND calculation can be performed on the output of each of these line memory circuits and the serial output of shift register 9. This sort of structure allows performing logical AND calculations over a wider range, and motion detection errors can be reduced even more reliably.

Also, in the second embodiment the logical AND calculation for the moving object signal was performed on just the high luminance side of the image signal, but the present invention is not restricted to this. For example, the logical AND calculation for the moving object signal can be performed on the low luminance side of the image signal. This sort of structure makes it possible to selectively reduce motion detection errors caused by random noise.

Figure 7:
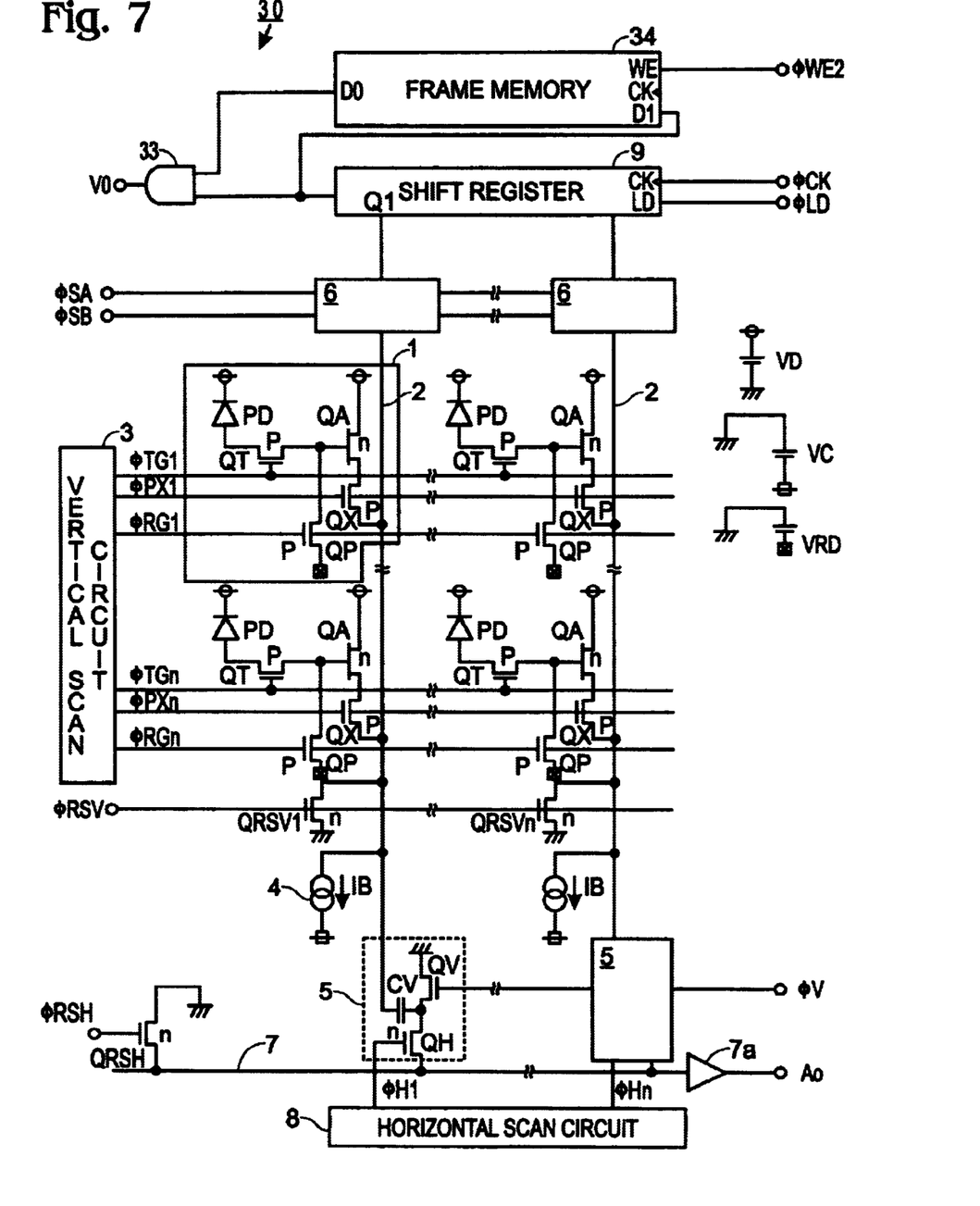
FIG. 7 is a schematic drawing of a circuit of a third preferred embodiment of the present invention.

A third preferred embodiment is described below with reference to FIGS. 7 and 8. FIG. 7 is a schematic drawing of the circuit of the third embodiment. The following discussion relates to differences of the third preferred embodiment 30 as to the first preferred embodiment 10.

First, shift register 9's serial output is respectively supplied to one input of AND circuit 33 and frame memory 34's data input. Frame memory 34's data output is supplied to the other input of AND circuit 33. AND circuit 33's output is externally supplied as the moving object signal.

Other schematic requisites are identical to the schematic requisites of the first embodiment of FIG. 1, so they are indicated by applying the same reference codes in FIG. 7, and discussion of them is omitted here.

Next, the operation when doing a horizontal transfer in the third embodiment is explained. The vertical transfer operation in the third embodiment is the same as in the first embodiment of FIG. 3, so discussion of it shall be omitted here.

Figure 8:
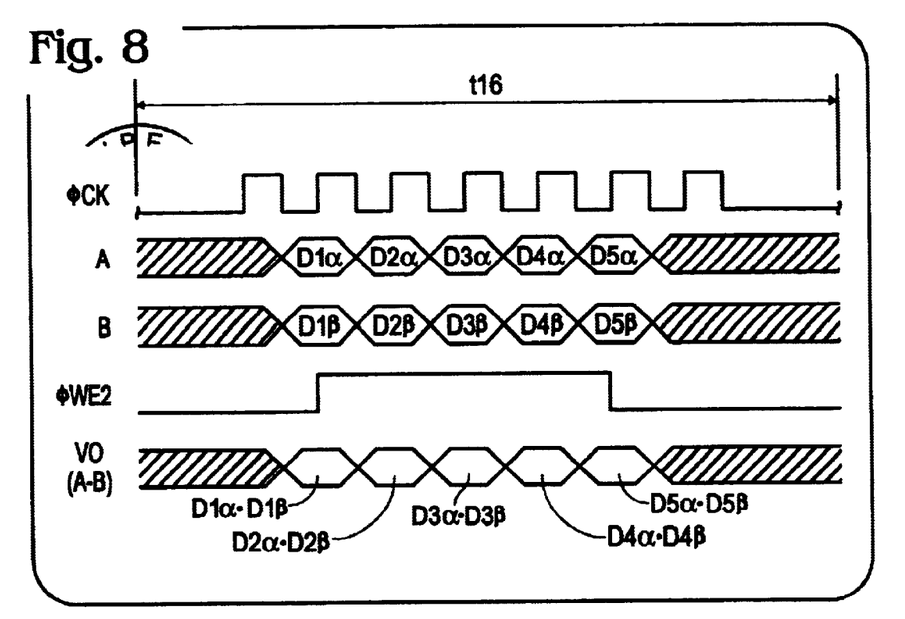
FIG. 8 is a drawing showing the drive timing for horizontal transfer in the third preferred embodiment.

FIG. 8 is a drawing showing the drive timing for horizontal transfer in period t16. First, in this timing period t16, transfer pulse φCK is sequentially applied to shift register 9. Inter-frame comparison results D1α . . . Dmα (shown as D1α . . . D5α, etc. in FIG. 8), that are the output of abnormal value detection circuit 6, are sequentially output from the serial output of shift register 9 in sync with the fall of this transfer pulse φCK and applied to AND circuit 33.

These inter-frame comparison results pass through frame memory 34 and are delayed by just one frame. As a result, the comparison results, delayed by just one frame, are sequentially output from frame memory 34's data output (shown as D1β . . . D5β, etc. in FIG. 8) and applied to AND circuit 33.

AND circuit 33 performs a logical AND operation on these comparison results and externally outputs the moving object signal V0.

Through the operation described above, frame memory 34 and the logical calculation circuit consisting of AND circuit 33 exclude the sort of isolated regions which occur when only one pixel is at a high level in the time axis direction from the inter-frame comparison results. Therefore it is possible to reduce motion detection errors caused by shot noise or small background motions.

Furthermore, a junction-type field effect transistor was used as amplifier element QA in the first, second and third embodiments described above, but it is not restricted to this structure. In general, any element which has an amplifying function can be used as amplifier element QA. For example, a MOS transistor or a bipolar transistor or the like can be used as amplifier element QA. It is also possible to use functional elements which use a combination of these elements. It is also possible to save the signal charge in the parasitic capacitance which occurs at the gate or base of these amplifier elements, and supplementary capacitors, etc. for saving the signal charge at the gate or base of these amplifier elements can be provided.

In addition, vertical transfer MOS switch QX was provided as the connection and separation unit in the first, second, and third embodiments described above, but it is not restricted to this. For example, amplifier element and vertical read line connection and separation control can also be performed by providing a capacitor to accumulate the signal charge at the gate or base of these amplifier elements, and raising or lowering the voltage at the other end of this capacitor.

Also, the aforesaid first, second, and third embodiments described cases in which the signal charge created by photodiode PD was transferred directly to the amplifier element's control region, but the present invention is not restricted to this. For example, the signal charge can be temporarily transferred to a diffusion region and saved there, and then the gate of a MOS transistor can detect the potential of this diffusion region via a signal line.

Furthermore, in the first, second, and third embodiments described above a logical AND calculation for the moving object signal was performed in a spatial direction or a time axis direction, but it is not restricted to this. In general, calculations should be performed to reduce the unrelated noise component in the moving object signal. For example, numerical calculations or the like can be performed instead of a logical AND calculation.

In addition, the first embodiment described above explained a case in which unit pixels 1 were arranged in a two-dimensional matrix, but of course the present invention can be suitably used in the same way in a linear imaging element arranged in a one-dimensional matrix.

Also, the embodiments described above explained circuit structure based on positive logic, but it is not restricted to this structure. Of course it is possible to use a circuit structure in which part or all of the aforesaid circuit structure is based on negative logic.

As described above, the present invention outputs the previous frame's pixel output and the current frame's pixel output on the vertical read line by time division. By comparing these pixel outputs it is possible to achieve motion detection inside a solid-state imaging apparatus. Therefore it is not necessary to specially provide circuits such as an A/D conversion circuit, image memory or image processing circuits, etc. external to the solid-state imaging apparatus.

Also, the present invention does not need to conduct the image signal, which is an analog signal, to an external A/D conversion circuit or the like, so the risk of being affected by peripheral noise is minor.

In addition, the present invention does not need the conventional required A/D conversion circuit external to the solid-state imaging apparatus for motion detection. As a result, there are no dynamic range limitations due to the A/D conversion circuit, and motion can be detected using the wide dynamic range of the solid-state imaging apparatus itself.

Also, in the present invention the previous frame's pixel output and the current frame's pixel output are directly compared for each vertical read line. Therefore absolutely no phase shifting occurs in the pixel position to be compared, in contrast to the prior art in which the interframe difference is found via A/D conversion. Therefore the risk of inter-frame differences occurring at the edge portion of a stationary body is extremely small, and motion detection can be carried out with even greater high accuracy.

Also, the present invention carries out a logical calculation on the comparison circuit's comparison result and reduces the isolated regions of logical change. Therefore, isolated regions caused by shot noise and tiny background motions are reduced inside the solid-state imaging apparatus, and superfluous motion detection caused by these can be suitably suppressed.

The present invention also selectively outputs one of the pixel outputs transferred by time division on a vertical read line, so the current frame's or the previous frame's image signal can be output. This sort of image signal output operation does not monopolize a vertical read line, so it does not interfere with operation of the motion detection side. Therefore the solid-state imaging apparatus of the present invention makes it possible to simultaneously output the moving object signal and the image signal.

This simultaneous output of image signal and moving object signal greatly increases the variation in image displays using both of these signals, and greatly widens the applications of the solid-state imaging apparatus for motion detection.

The present invention also provides means to perform output switching of the logical calculation circuit's output and the comparison circuit's comparison result according to the image signal's signal level. This switching operation makes it possible to appropriately reduce motion detection errors in accordance with the image signal's signal level. And, at the same time it does not unnecessarily remove isolated regions in accordance with the image signal's signal level, so it is possible to make great efforts to detect the motion of small detection subjects.

For example, when selecting and outputting the output of the logical calculation circuit side in the high luminance area of the image signal, it is possible to selectively reduce motion detection errors due to shot noise. And by selecting and outputting the output of the comparison circuit side in the low luminance area of the image signal, it is possible to make great efforts to detect the motion of small detection subjects which is essentially unrelated to shot noise.

And, for example, if the output of the logical calculation circuit is selected and output in the low luminance area of the image signal, it is possible to selectively reduce motion detection errors caused by random noise in the circuit system, etc. And by selecting and outputting the output of the comparison circuit side in the high luminance area and the medium luminance area of the image signal, it is possible to make great efforts to detect the motion of small detection subjects which is essentially unrelated to random noise.

In addition, for example, if the output of the logical calculation circuit is selected and output in the low luminance area and the high luminance area of the image signal, it is possible to selectively reduce motion detection errors caused by random noise and shot noise. And by outputting the output of the comparison circuit side in the medium luminance area, it is possible to make great efforts to detect the motion of small detection subjects which is essentially unrelated to random noise or shot noise.

Furthermore, each of the above sort of operations is an operation which first becomes possible with a structure which simultaneously outputs a moving object signal and an image signal.

The present invention may also perform a logical AND operation on comparison results along a screen's horizontal direction. Therefore, it excludes isolated points of the sort created by a logical change of only one pixel in the horizontal direction, and can reduce isolated points of logical change created by shot noise or small background motions, etc.

The present invention may also perform a logical AND operation on comparison results along a screen's vertical direction. Therefore, it excludes isolated points of the sort created by a logical change of only one pixel in the vertical direction, and can reduce isolated points of logical change created by shot noise or small background motions, etc.

The present invention may also perform a logical AND operation on comparison results along the time axis direction. Therefore it excludes isolated points of the sort created by a logical change of only one pixel in the time axis direction, and can reduce isolated points of logical change created by shot noise or small background motions, etc.

The present invention may also provide a pixel output save unit for each photoreceptive unit, so the operation of accumulating the current frame's pixel output in the photoreceptive unit and the operation of saving or outputting the previous frame's pixel output can be executed simultaneously and in parallel.

Therefore two frames of pixel output are output on a vertical read line by time division, so the current frame's photoreceptive accumulation period is not restricted. As a result, the pixel output level is high and it is possible to drastically reduce erroneous detection of motion due to noise.

The present invention may also save the pixel output from a photoreceptive unit directly in an amplifier element's control region, so it is not necessary to provide a capacitive component, etc. in order to save the pixel output along the way. This also may eliminate capacitance distribution signal loss in the capacitive component along the way, and make it possible to increase the S/N ratio.

Also, the control region is initialized to a constant reset potential by a reset circuit, so it is possible to prevent mixing pixel outputs between frames. As a result, the pixel output S/N ratio increases, and it is possible to drastically reduce erroneous detection of motion due to noise, etc.

The present invention provides a comparison circuit that outputs a binary signal. Therefore the logical calculation circuit should consist of a general purpose logic circuit. Also, a shift register circuit may be used to transfer the binary signal. Using this sort of shift register circuit makes it possible to easily achieve high speed and low noise in the operation of horizontally transferring the moving object signal.

In particular, making the moving object signal binary increases the noise margin during signal transfer, so it is possible to drastically reduce erroneous detection of motion due to noise.

This specification sets forth the best mode for carrying out the invention as known at the time of filing the patent application and provides sufficient information to enable a person skilled in the art to make and use the invention. The specification further describes materials, shapes, configurations and arrangements of parts for making and using the invention. However, it is intended that the scope of the invention shall be limited only by the language of the claims and the law of the land as pertains to valid U.S. patents.

What is claimed is:

1. A solid-state imaging apparatus for motion detection, comprising:

a plurality of solid-state pixels each pixel having a photoreceptive element that generates a charge potential in response to incident light on the photoreceptive element and the pixel provides a pixel output of a pixel signal corresponding to the charge potential, the plurality of pixels arranged in a matrix having at least one row and one column;

a plurality of read lines in communication with a respective number of columns of the plurality of pixels;

a first transfer circuit that controls pixel output so that a first pixel signal is provided to a respective read line for each pixel of a selected row of pixels and a second pixel signal is provided to the respective read line for each pixel of the selected row of pixels in a time division manner;

a plurality of comparison circuits in communication a respective plurality of the vertical read lines, each comparison circuit compares the first pixel signal and the second pixel signal and provides a respective plurality of comparison signals;

a horizontal transfer circuit that receives the plurality of comparison signals and transfers the comparison signals serially;

a logical calculation circuit that serially receives the comparison signals and performs a logical calculation on the comparison signals and provides a logical calculation signal to detect motion of an object;

an image signal output circuit in communication with the plurality of read lines that provides an image signal corresponding to the incident light on the photoreceptive elements;

a level decision circuit that determines a level of the image signal from the image signal output circuit; and an output switching circuit that switches and outputs the logical calculation signal and the comparison signal according to the level of the image signal.

2. The solid-state imaging apparatus for motion detection of claim 1, wherein the logical calculation circuit includes:

(a) a bit memory circuit that stores the comparison signal for each pixel; and (b) a horizontal AND circuit that performs a logical AND calculation on the bit memory circuit contents and the comparison signal.

3. The solid-state imaging apparatus for motion detection of claim 1, wherein the logical calculation circuit includes:

(a) a line memory circuit that stores the comparison signal for each row; and (b) a vertical AND circuit that performs a logical AND calculation on the line memory circuit contents and the comparison signal.

4. The solid-state imaging apparatus for motion detection of claim 1, wherein the logical calculation circuit includes:

(a) a frame memory circuit that stores the comparison signal for each matrix; and (b) a time axis AND circuit that performs a logical AND calculation on the frame memory circuit contents and the comparison signal.

5. The solid-state imaging apparatus for motion detection of claim 1, wherein the first transfer circuit includes:

(a) a pixel output save unit, provided for each of the photoreceptive elements, that saves the charge potential from the photoreceptive element and provides pixel signals corresponding to the saved charge potential; and (b) an output transfer gate, provided for each of the pixel output save units that connects and separates the pixel output save unit and the respective read line.

6. The solid-state imaging apparatus for motion detection of claim 5 wherein the pixel output save unit includes:

(a) an amplifier element that has a control region that saves the charge potential and that outputs the pixel signal corresponding to the charge potential saved in the control region;

(b) a transfer gate that transfers the charge potential created by the photoreceptive element to the amplifier element's control region; and (c) a reset circuit that resets the charge potential accumulated in the amplifier element's control region.

7. The solid-state imaging apparatus for motion detection of claim 6, wherein the amplifier element is a junction type field-effect transistor, and pixel signals transferred via the transfer gate are directly accumulated in the gate region of the junction type field-effect transistor.

8. The solid-state imaging apparatus for motion detection of claim 1, wherein the comparison circuit compares the first pixel signal and the second pixel signal within a predetermined range, and outputs a binary signal according to the comparison.

9. An improved solid-state imaging apparatus for motion detection having a plurality of pixels, each pixel having a photoreceptive element that generates a charge potential when the photoreceptive element is subjected to incident light, a transfer gate in communication with the photoreceptive element, and an amplifier in communication with the transfer gate so that the transfer gate may be controlled by a first control signal to conduct the charge potential from the photoreceptive element to the amplifier and the transfer gate may be controlled by the first control signal to be non-conductive so that the charge potential of the photoreceptive element is not conducted to the amplifier, and a reset circuit in communication with the amplifier to reset a control region of the amplifier after the amplifier has received the charge potential, the solid-state imaging apparatus further including a vertical scanning circuit that controls output of pixel signals from the amplifier onto a respective plurality of read lines, the improvement comprising:

a plurality of comparison circuits in communication with a respective plurality of the read lines that compares sequential pixel signals and provides a plurality of comparison results;

a logical circuit that receives the plurality of comparison results and provides a moving object signal;

an image signal output circuit that receives the pixel signals and provides an image signal simultaneously with the moving object signal; and an image signal level detector that compares the image signal to a threshold voltage and provides a level decision signal.

10. The solid-state imaging apparatus for motion detection of claim 9, further comprising a shift register that serially transfers the comparison results to the logical circuit.

11. The solid-state imaging apparatus for motion detection of claim 9 wherein the logical circuit comprises a D flip flop and an AND circuit.

12. The solid-state imaging apparatus for motion detection of claim 9 further comprising a frame memory circuit and wherein the logical circuit comprises an AND circuit.

13. The solid-state imaging apparatus for motion detection of claim 9 wherein each pixel further comprises a reset element to reset a potential on the amplifier between successive charge potentials received from the photoreceptive element.

14. The solid-state imaging apparatus for motion detection of claim 9 wherein the image signal output circuit comprises a plurality of processing circuits in communication with the read lines and that receives the pixel signals, and a horizontal scanning circuit that provides second control signals to control the processing circuits.

15. An improved solid-state imaging apparatus for motion detection having a plurality of pixels, each pixel having a photoreceptive element that generates a charge potential when the photoreceptive element is subjected to incident light, a transfer gate in communication with the photoreceptive element, and an amplifier in communication with the transfer gate so that the transfer gate may be controlled by a first control signal to conduct the charge potential from the photoreceptive element to the amplifier and the transfer gate may be controlled by the first control signal to be non-conductive so that the charge potential of the photoreceptive element is not conducted to the amplifier, and a reset circuit in communication with the amplifier to reset a control region of the amplifier after the amplifier has received the charge potential, the solid-state imaging apparatus further including a vertical scanning circuit that controls output of pixel signals from the amplifier onto a respective plurality of read lines, the improvement comprising:

a plurality of comparison circuits in communication with a respective plurality of the read lines that compares sequential pixel signals and provides a plurality of comparison results;

a logical circuit that receives the plurality of comparison results and provides a moving object signal;

an image signal output circuit that receives the pixel signals and provides an image signal simultaneously with the moving object signal; and a first shift register and a second shift register and the logical circuit comprises a plurality of D flip flops and a plurality of logic elements.

16. A solid-state imaging apparatus for motion detection, comprising:

a plurality of pixels, a vertical scanning circuit that controls output of pixel signals from the plurality of pixels, a plurality of vertical read lines in communication with the plurality of pixels for conducting the pixel signals, a comparison circuit in communication with the vertical read lines that receives and compares successive pixel signals and provides a comparison signal, a logical calculation circuit in communication with the comparison circuit that receives the comparison signal and provides a moving object signal, and an image level detection circuit that determines a level of the image signal and provides an image level signal that is provided to the logical calculation circuit to reduce effects due to shot noise.

17. The solid-state imaging apparatus for motion detection of claim 16 further comprising having no analog to digital converter external to the solid-state imaging apparatus to provide a signal indicative of motion of an object.

18. The solid-state imaging apparatus for motion detection of claim 16 further comprising an image signal output circuit in communication with the vertical read lines for sequentially reading the pixel signals on the plurality of vertical read lines and providing an image signal that is output from the solid-state imaging apparatus simultaneously with the moving object signal from the logical calculation circuit.

19. A method of detecting motion of an object with a solid-state imaging apparatus having a plurality of pixels, each pixel including a photoreceptive element, an amplifier, and at least one transfer gate controlled by a first scanning circuit so that charge potential on the photoreceptive element can be transferred to the amplifier and the amplifier can provide a pixel signal corresponding to the charge potential to a respective one of a plurality of read lines, and a reset circuit to reset a control region of the amplifier after the amplifier receives the charge potential, comprising the steps:

exposing the photoreceptive element to first incident light having a detection object in a light path of the first incident light and thereby generating a first charge potential on the photoreceptive element;

transferring a first group of first charge potentials to the amplifiers and providing a first group of first analog pixel signals to the read lines;

exposing the photoreceptive element to second incident light and thereby generating a second charge potential on the photoreceptive element;

transferring a second group of second charge potentials to the amplifiers and providing a second group of second analog pixel signals to the read lines;

comparing at least one first analog pixel signal of the first group to a respective one second analog pixel signal of the second group and providing a comparison signal; and performing a logical calculation on the comparison signal to provide a moving object signal;

conducting the pixel signals to an image output circuit and outputting an image signal from the image output circuit simultaneously with the moving object signal; and determining a level of the image signal and providing an image signal level signal.

20. The method of claim 19 wherein the comparing step comprises comparing each of the analog pixel signals of the first group of pixel signals to a respective one of the analog pixel signals of the second group of pixels signals and providing a respective plurality of comparison signals.

21. The method of claim 20 further comprising the step of providing the plurality of comparison signals to a horizontal transfer circuit and serially outputting the comparison signals to perform the logical calculation on the comparison signals in sequence.

22. The method of claim 19 wherein the step of comparing pixel signals comprises comparing pixel signals of successive time divided signals to a threshold voltage to signals outside a predetermined range.

23. The method of claim 19 wherein the step of performing a logical calculation further comprises the step of using the image signal level signal to perform the logical calculation.

* * * * *